UNITED STATES PATENT OFFICE.

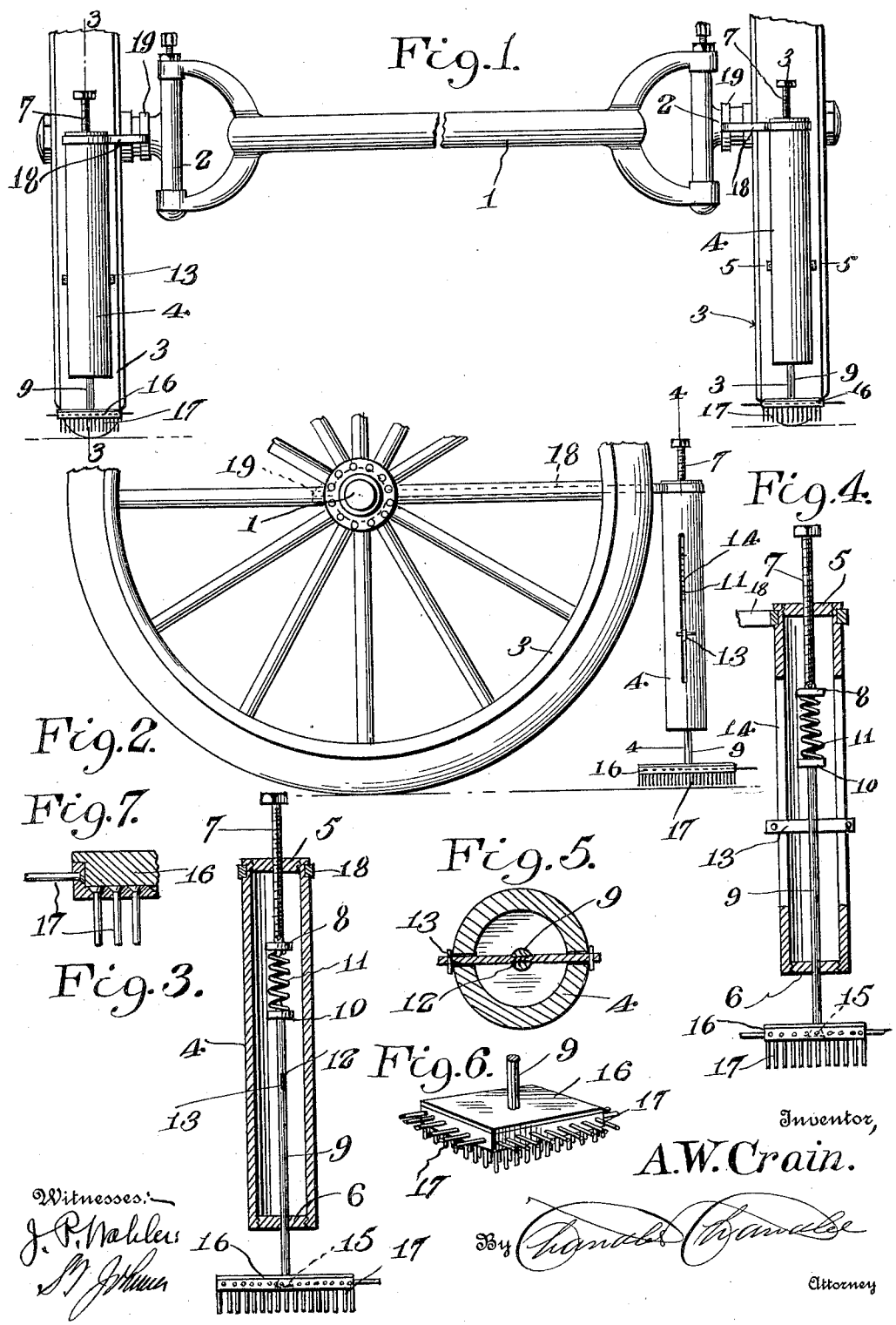

ALONZOE W. CRAIN, OF PETROLEUM, INDIANA.

GUARD FOR TIRES.

1,067,239.

Specification of Letters Patent.  Patented July 15, 1913.

Application filed August 26, 1912. Serial No. 717,116.

*To all whom it may concern:*

Be it known that I, ALONZOE W. CRAIN, a citizen of the United States, residing at Petroleum, in the county of Wells, State of Indiana, have invented certain new and useful Improvements in Guards for Tires; and I do hereby declare the following to be a full, clear, and exact description of the invention, such as will enable others skilled in the art to which it appertains to make and use the same.

The present invention is directed to improvements in guards for tires, and particularly to pneumatic tires for motor vehicles.

The invention has for its object to so construct a device of this character that the same when applied to an automobile will be so positioned in respect to the front wheels thereof that any objects in the path of the wheels will be brushed aside, thus preventing injury to the tires, and prolonging the life thereof.

With these and other objects in view, this invention resides in the novel features of construction, formations, combinations and arrangements of parts to be hereinafter more fully described, claimed and illustrated in the accompanying drawing, in which—

Figure 1 is a front elevation of an automobile axle showing the same equipped with the device. Fig. 2 is a side elevation of the same. Fig. 3 is a sectional view on line 3—3 of Fig. 1. Fig. 4 is a similar view on line 4—4 of Fig. 2. Fig. 5 is a similar view on line 5—5 of Fig. 1. Fig. 6 is a detail perspective view of the brush. Fig. 7 is a detail sectional view of a part of the brush head showing the manner of securing the bristles or wires.

Referring to the drawing, the numeral 1 designates the front axle having the usually constructed steering knuckles 2, and upon which the wheels 3 are journaled. The guards consist of cylinders 4, the same being closed at their upper and lower ends by plates 5 and 6, respectively. Threaded through the center of the upper plate 5 is an adjusting screw 7, the lower end of which is provided with a disk 8, the purpose of which will appear later. Slidably mounted in the lower plate 6 is a rod 9, the upper end of which is provided with a disk 10, the same being yieldably connected to the disk 8 by a coil spring 11, said spring having its terminals suitably connected to the respective disks. The rod 9 is provided near its upper end with a slot 12, in which is fixed the central portion of a cross bar 13, the opposite ends of which are slidably mounted in slots 14 which are formed in the cylinders at diametrically opposite points, said cross bar being for the purpose of preventing rotation of the rod 9, but at the same time allowing the rod to move upwardly and downwardly. The lower end of the rod 9 is provided with a head 15, and to which is bolted the head 16 of the wire brush 17. Fixed near the upper ends of the cylinders 4 are arms 18, the inner ends of which are provided with clips 19 so that the same may be firmly secured to the steering knuckles 2 of the vehicle axle. From this construction it will be seen that when the guards are in place the same will be compelled to travel the same direction as the front wheels of the vehicle, and that the brush 17 will be held in yielding contact with the roadway, thus brushing objects aside to prevent injury of the tires during the travel of the vehicle. Further it will be noted that when rough or uneven parts of the roadway contact with the brush the same will move upwardly due to the coil spring 11, which also serves to move the rod downwardly and the brush in contact with the road after the uneven parts of the roadway have been passed, the tension of said spring being regulated by the adjusting screw 7.

What is claimed is:—

1. In combination with the steering knuckle of a vehicle, of cylinders supported thereby, rods supported in the lower ends of said cylinders, adjusting screws passable through the upper end of the cylinders, springs interposed between the rods and adjusting screws, means for preventing the rods from rotating, and brushes secured to the lower ends of said rods, as and for the purpose set forth.

2. In combination with the steering knuckle of a vehicle, of cylinders supported thereby, said cylinders having their upper and lower ends closed by plates, an adjusting screw passable through the upper plate and having a disk secured at its lower end, a rod slidably mounted in the lower plate and having its upper end provided with a disk, a coil spring interposed between said disks and secured thereto, said cylinders having slots formed in their sides, a cross bar having its opposite ends mounted in said slots, a brush secured to the lower end of said rod, as and for the purpose set forth.

In testimony whereof, I affix my signature, in presence of two witnesses.

ALONZOE W. CRAIN.

Witnesses:
J. W. BEARS,
J. V. JOHNSON.